Dec. 23, 1930.  F. H. OWENS  1,786,025
OPTICAL SYSTEM FOR REPRODUCING SOUND RECORDS
Filed June 25, 1924
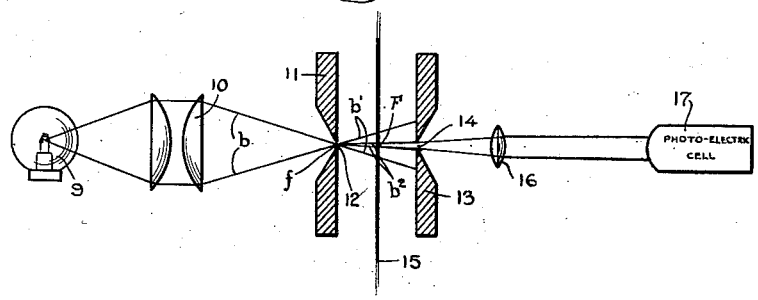
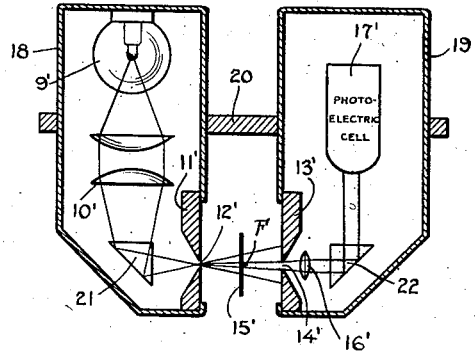
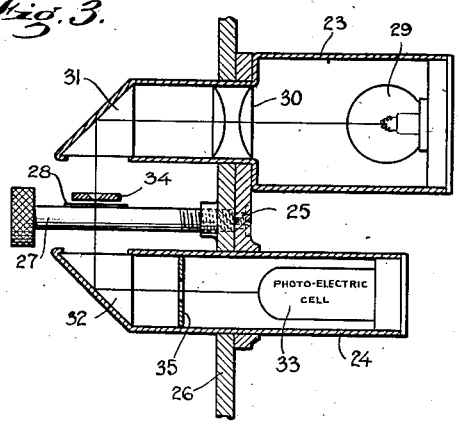
INVENTOR
Freeman H. Owens
BY
ATTORNEYS Patented Dec. 23, 1930

1,786,025

UNITED STATES PATENT OFFICE

FREEMAN H. OWENS, OF NEW YORK, N. Y.

OPTICAL SYSTEM FOR REPRODUCING SOUND RECORDS

Application filed June 25, 1924. Serial No. 722,355.

This invention relates to an optical system for reproducing photographic sound records, and has special reference to the provision of an improved optical system for reproducing sound from photographic sound records with increased fidelity and definition.

In reproducing sound from photographic records, it is known to move the sound record such as a photographic film across a slit in an exposure gate through which a beam of light is projected, the slit functioning to confine or restrict the area of illumination on the film used for reproduction. Since the fidelity and clarity of the sound reproduced depends upon the definition with which the photographed sound waves may be isolated for illumination and projection, it is found necessary to use slits of very small dimensions, such for example as .0015 inches for standard size motion picture film, and it is found desirable to feed the film or record in very close contact with the gate, especially where the beam projected through the slit in the gate is a diverging beam. When film of less than standard size is desired to be employed, the slit must be correspondingly reduced in dimensions and beyond practical or serviceable limitations, and hence known optical methods of projecting sound records are ill adapted for film records of comparatively small size. Moreover, when film either of standard or less than standard size is fed in close contact with the gate, dirt and other foreign matter accumulate and clog the slit, interfering with its intended light-admitting function. To overcome these objections incident to the use of prior optical methods of projecting sound records, and to produce an optical system in which the definition of illumination on the film for projection purposes may be increased while the film is moved without contacting the gate, is a prime desideratum of my present invention.

A further principal object of my present invention relates to the provision of an optical mount in which the elements for illuminating the film and for projecting the sound record thereon are arranged to permit facile lateral adjustment of the mount with respect to a film for projecting any of a series of sound records longitudinally arranged on the film, and in which the said elements are coordinated in a compact manner, producing a mount of relatively small proportions which is suitably adapted as an attachment to motion picture machines employing film having motion picture and sound records thereon.

To the accomplishment of the foregoing and such other objects as will hereinafter appear, my invention consists in the elements and their relation one to the other, as hereinafter particularly described and sought to be defined in the claims; reference being had to the accompanying drawings which show preferred embodiments of my invention, and in which:

Fig. 1 is a diagrammatic view showing the improved optical system of my invention, Fig. 2 is a view of the optical mount of my invention showing the manner in which the optical elements are arranged thereon, and Fig. 3 is a view of a modified form of optical mount embodying certain principles of my invention.

Referring now more in detail to the drawings, and more particularly to Fig. 1 thereof, the optical system for reproducing photographic sound records comprises a means for producing a converging beam of light which includes the source of illumination 9 and the condensing lens 10 functioning to produce a projected beam of light $b$ and for converging the same to a focus $f$ at which a gate 11 is located having a slit 12 of small dimensions located substantially at the focus of the projected light beam, as clearly shown in Fig. 1 of the drawings, this structure being that used in prior practice. It will be noted that the projected beam of light issuing from the slit 12 is diverging in character, as shown at $b'$, so that in prior practice it was necessary in order to limit the area of illumination of the film used for reproduction purposes to move the film record in objectionably close contact with the front surface or wall of the gate 11.

In the optical system of my invention, the film record is moved preferably out of contact with the gate 11, and for producing a limited area of illumination on the film which is effective for reproducing purposes, I provide means in the form of a second gate 13 having a slit 14 located in the diverging beam of light $b'$, which slit is effective for producing from said light beam a beam of light of reduced divergence designated as $b^2$. With this construction, it will be noted that the projected beam of light which passes through the slit 14 of the second gate 13 is effective on a very small area of the film 15, which film preferably is located between the two gates 11 and 13 and out of contact with both of said gates, the construction being such that a very accurate definition on the film may be obtained with the film moved freely in the space defined by and between the slitted gates. While I have shown the film 15 located between the gates, it will be obvious that both gates may be arranged in cascade to one side of the film, with the film arranged in advance of both gates. The arrangement shown in Fig. 1 of the drawings, however, is preferred, since greater sensitiveness of reproduction may be obtained with the film located between the slitted gates.

In the preferred form of the invention I have found that the clarity and faithfulness of the reproduced sound may be still further enhanced by the provision of a lens 16 of relatively short focus located in advance of the slitted gate 13, the focus of the said lens being either at the slit 14 or at the film 15, the latter being indicated in Fig. 1 of the drawings, the said lens functioning to project the light beam onto a light-responsive element such as a photoelectric cell 17. I have found that very desirable results may be obtained by employing a lens of about 16 mm. focus.

Referring now to Fig. 2 of the drawings, I show the optical system embodying the principles of my invention constructed in the form of a lens mount designed to permit of facile lateral adjustment of the mount with respect to the film and to produce a compactness of organization which permits the optical elements to be boxed in small confines, and which permits the mount to be used as an attachment to motion picture and sound reproducing machines. This optical mount preferably comprises the two sections 18 and 19 fixed to a support 20, the section 18 including the source of illumination 9', the condensing lens 10' for producing the converging beam of light, a reflector 21 in the path of the converging beam for reflecting the same at an angle of 90° and focusing the beam at the slit 12' of the gate 11'. The second section 19 includes the second gate 13' arranged parallel to the gate 12' and having the slit 14' arranged in alinement with the slit 12', the construction being such that the sound record 15' may be located between the two gates in the diverging beam of light, the said second section further including a lens of short focus 16' arranged in advance of the gate 13' and a reflector 22 for directing the reflected beam of light in a path parallel to the axis of the original projected beam and in a direction so that all of the elements lie to one side of the film 15', the re-reflected or directed light beam being projected onto a light-responsive element such as the photoelectric cell 17'. With this construction it will be seen that the mount may be adjusted as a whole parallel to the plane of the film 15', so that any of a series of longitudinally arranged sound records may be illuminated and projected as desired, and during the adjustment of the mount both the lamp and the cell units move together, maintaining a correct center for the light focus. It will be furthermore apparent that by the arrangement of the elements provided, a very compact organization is produced, adapting the device for use as a small attachment to a motion picture machine.

Referring now to Fig. 3 of the drawings, I show a modified form of the invention in which the elements are arranged in unitary mount form without the employment of the cascaded gate structure. In this form of my invention the lamp and cell units also comprise two sections 23 and 24 both fixed to a support 25 which may be moved to and from a frame portion 26 of a motion picture machine by means of a thumb screw device 27 for laterally adjusting the mount relatively to a film 28. The section 23 comprises the source of illumination 29, condensing lens 30, and a reflector 31 for reflecting the projected beam an angle of 90°; and the second section 24 comprises a second reflector 32 arranged to reflect the reflected beam at an angle of 90° for projection onto a photoelectric cell 33 also forming part of the section 24. For restricting the area of illumination on the film, a gate 34 may be provided, and if desired a diaphragm 35, which may be of the iris type, may be employed for adjusting the volume of light admitted to the photoelectric cell to adjust the volume of reproduced sound.

While I have shown my invention in the preferred forms, it will be obvious that many changes and modifications may be made in the structure disclosed without departing from the spirit of the invention defined in the following claims.

I claim:

1. An optical system for reproducing photographic sound records comprising means for producing a converging beam of light, a gate having a slit located substantially at the focus of the light beam, the beam diverging from said slit for illuminating a sound record spaced in advance of said gate, and a second gate arranged in advance of the first gate immediately adjacent said sound record and spaced therefrom a distance substantially equal to the distance between said sound record and said first mentioned gate, the said second gate having a slit located in the diverging light beam effective for producing from said light beam a beam of light of reduced divergence for sound reproducing action on said record.

2. An optical system for reproducing photographic sound records comprising means for producing a converging beam of light, a gate having a slit located substantially at the focus of the light beam, the beam diverging from said slit for illuminating a sound record spaced in advance of said gate, and a second gate arranged in advance of the first gate and spaced therefrom to permit movement of the sound record between the gates in a position substantially equi-distant from each of said gates, the said second gate having a slit located in the diverging light beam effective for producing from said light beam a beam of light of reduced divergence for sound reproducing action on said record.

3. An optical system for reproducing photographic sound records comprising means for producing a converging beam of light, a gate having a slit located substantially at the focus of the light beam, the beam diverging from said slit for illuminating a sound record spaced in advance of said gate, a second gate arranged in advance of the first gate, the said second gate having a slit located in the diverging light beam effective for producing from said light beam a beam of light of reduced divergence, a light responsive element and a lens located in said reduced light beam between the second gate and the light responsive element.

4. An optical system for reproducing photographic sound records comprising means for producing a converging beam of light, a gate having a slit located substantially at the focus of the light beam, the beam diverging from said slit for illuminating a sound record spaced in advance of said gate, and a second gate arranged in advance of the first gate and the sound record, the said second gate having a slit located in the diverging light beam effective for producing from said light beam a beam of light of reduced divergence, a light responsive element, and a lens of short focus arranged in said reduced light beam between the second gate and the light responsive element.

5. An optical mount for reproducing photographic sound records comprising means for producing a projected beam of light, means for reflecting said projected beam at an angle of 90°, a gate having a slit located substantially at the focus of the light beam, the beam diverging from said slit onto a sound record for illuminating the same, means for reflecting the beam from said sound record at an angle of 90° into a path parallel to the axis of the projected beam and lying on the same side of the sound record, the path of said reflected beam of light being in a direction opposite to that of the path of the projected beam of light, and a light responsive element in said reflected path and divergent beam.

6. An optical mount for reproducing photographic sound records comprising a source of illumination and a condensing lens for producing a projected light beam, a reflecting element in said light beam for reflecting the same an angle of 90°, a gate having a slit located substantially at the focus of the light beam, the beam diverging from said slit onto a sound record which is adapted to be arranged with the plane of the sound record parallel to the axis of the projected beam, a second reflecting element in the path of the reflected beam for directing the reflected beam into a path parallel to the axis of the projected beam but in opposite direction, and a photoelectric cell located in the path of said directed and divergent beam.

7. An optical mount for reproducing photographic sound records comprising two sections arranged on opposite sides of a plane in which the sound record is located, one section including means for producing a converging beam of light, a reflector in said light beam and a gate having a slit located substantially at the focus of the light beam, and the second section including a gate parallel to said first gate and having a slit arranged in alinement with the slit of the first gate, a reflector in advance of said second gate and a photoelectric cell arranged in advance of said second reflector.

8. An optical mount for reproducing photographic sound records comprising two sections arranged on opposite sides of a plane in which the sound record is located, one section including means for producing a converging beam of light, a reflector in said light beam and a gate having a slit located substantially at the focus of the light beam, and the second section including a gate parallel to said first gate and having a slit arranged in alinement with the slit of the first gate, a reflector in advance of said second gate, a photoelectric cell arranged in advance of said second reflector and a lens of short focus between said second gate and the second reflector.

Signed at New York city, in the county of New York and State of New York, this 23rd day of June, A. D. 1924.

FREEMAN H. OWENS.